US007507359B2

(12) United States Patent
Werfeli

(10) Patent No.: US 7,507,359 B2
(45) Date of Patent: Mar. 24, 2009

(54) METHOD AND APPARATUS FOR CONTROLLING AND REGULATING THE DISTRIBUTION OF AN INJECTION MOLDING COMPOUND

(75) Inventor: Friedrich Werfeli, Schwändi (CH)

(73) Assignee: Nestal-Maschinen AG (CH)

( * ) Notice: Subject to any disclaimer, the term of this patent is extended or adjusted under 35 U.S.C. 154(b) by 592 days.

(21) Appl. No.: 10/450,119

(22) PCT Filed: Nov. 9, 2001

(86) PCT No.: PCT/CH01/00659

§ 371 (c)(1),
(2), (4) Date: Nov. 5, 2003

(87) PCT Pub. No.: WO02/47887

PCT Pub. Date: Jun. 20, 2002

(65) Prior Publication Data

US 2004/0076702 A1    Apr. 22, 2004

(30) Foreign Application Priority Data

Dec. 12, 2000   (CH)   ..................................... 2418/00

(51) Int. Cl.
B29C 45/78   (2006.01)
(52) U.S. Cl. ................. 264/40.6; 264/328.15; 425/144; 425/549; 700/3; 700/202
(58) Field of Classification Search ................ 264/40.6, 264/328.8, 328.15; 425/143, 144, 549, 570, 425/572, 573; 700/3, 202
See application file for complete search history.

(56) References Cited

U.S. PATENT DOCUMENTS 4,707,310 A * 11/1987 Debeaud .................... 264/40.6

(Continued)

FOREIGN PATENT DOCUMENTS

EP   0 165 114 A1   12/1985

(Continued)

OTHER PUBLICATIONS

JP 61-115108 published Jun. 2, 1986, English Abstract.*

(Continued)

Primary Examiner—Jill L Heitbrink
(74) Attorney, Agent, or Firm—Finnegan Henderson Farabow Garrett & Dunner LLP

(57) ABSTRACT

The invention relates to a method and to a device for controlling/regulating the distribution of the injection molding compound in multi-cavity injection molds, especially for molds with a large number of cavities, for example 48 to 128 cavities. The invention distributes the injection molding compound in groups of, for example, four to twelve nozzles. Each group is provided with one classical nozzle, as the master nozzle, that is controlled via the local heating capacity and temperature sensors. All other nozzles or cavities of the same group are configured as slave nozzles that have no temperature sensors. The virtual actual temperatures are computed via saved model computations and are displayed on the user panel. The user is thus provided with the desired/actual temperature values for every nozzle and can thus influence every single nozzle, depending on the result, in the form of temperature values. The invention allows reduction of the regulation to a minimum while the quality of the injection molding compound distribution is maintained, thereby reducing production costs and allowing a more economic operation of the control and regulation systems.

23 Claims, 4 Drawing Sheets

U.S. PATENT DOCUMENTS

| | | | | |
|---|---|---|---|---|
| 4,755,126 A | * | 7/1988 | Leverenz | 425/144 |
| 5,206,033 A | * | 4/1993 | Stastny | 425/143 |
| 5,551,857 A | * | 9/1996 | Fujioka et al. | 425/143 |
| 6,090,318 A | | 7/2000 | Bader et al. | |
| 6,529,796 B1 | * | 3/2003 | Kroeger et al. | 700/202 |

FOREIGN PATENT DOCUMENTS

| | | |
|---|---|---|
| EP | 0 909 628 A2 | 4/1999 |
| JP | 61-115108 | 6/1986 |
| JP | 63-98007 | 4/1988 |

OTHER PUBLICATIONS

Joseph Ogando, "PC-based hot-runner controller handles all systems & voltages", Apr. 1997, *Plastics-Technology-Online*.

* cited by examiner

METHOD AND APPARATUS FOR CONTROLLING AND REGULATING THE DISTRIBUTION OF AN INJECTION MOLDING COMPOUND

TECHNICAL FIELD

The invention relates to a method for controlling/regulating the distribution of the injection molding compound to the cavities of multi-cavity injection molds via nozzles, as well as a multi-cavity injection mold with adjustable heating capacities for the individual nozzles as well as a device for measurement, regulation and display of temperatures.

STATE OF THE ART

Three groups of parameters are distinguished for injection molding. The first group of parameters relates to the physical values such as temperature and pressure of the prepared molten mass as well as the speed of the mass during the injection of the mass in the area of the injection worm and the injection cylinder, respectively. These parameters can be varied and optimized within relatively large limits.

The second group of parameters relates to the actual physical design of the injection mold, above all the individual cavities and their disposition relative to one another. This also includes the placement of the local heating elements and the local adjustability of the heating capacity. The customer can modify the structural part only in so far as appropriate adjusting devices are provided at the mold.

The third group of parameters relates to the above adjusting devices, which allow the exertion of influence locally on each individual cavity or at least each group of cavities. The production of pet forms is quasi a classic textbook example for multi-cavity injection molds with a large number of cavities. For example, a corresponding mold can have 48, 96 or 128 cavities. This means that for each injection molding cycle 48, 96 or 128 performs must be produced simultaneously. During the set-up for a production, the starting parameters of the above first group of parameters have to be fixed at first and tested with one or several test runs. In addition to the control devices already provided in the machine process, the result of the finished product is tested. A very important test method in this context is the purely sensory test of the finished product, mainly performed visually by the set-up person. Ideally, all individual parts from one injection cycle must be identical and flawless, provided each cavity has optimum and identical conditions, in particular in view of the joining nozzle as well as the locally effective heating capacity in the area of each nozzle.

In mold engineering, the cold or the hot runner technology is applied to distribute the injected material to the cavities. If the hot runner technology is used for the distribution of the material, each cavity normally has one nozzle, i.e. one narrowing, through which the material enters the hollow space. For molds that are used for the simultaneous production of several identical parts, the design of the construction ensures that the conditions for all cavities are as identical as possible. This relates above all to the flow path, the flow resistance as well as the temperature distribution. It is a known fact that the flow resistance of a narrowing can be modified by the temperature of the nozzle. This offers the set-up person a means to influence the material distribution to the individual cavities. The expression "as identical as possible" suggests already that this is an objective that can be met only approximately in practice.

Each nozzle can be fitted with a heating to influence the nozzle temperature. Each heating is actuated via a regulation element. The nozzle temperature can be modified by changing the manipulated variable. This works in practice, but it has the disadvantage that the nozzle temperature is also affected by interferences such as start-up, variations of the ambient conditions etc. Manipulated variables do not offer the user a feeling for what actually takes place at the nozzle and what the effect of a manipulation will be, respectively. The success of the manipulation therefore strongly depends on the experience of the set-up person, above all on whether or not the set-up person has learned to understand and properly interpret the complex correlations. Provided the mold and all parameters from the first group of parameters are optimally set, the set-up person or the user must now take the individual unsatisfactory pet forms to decide on type and dimension of a corrective action to be taken for the specific cavity and take said action. This makes high demands and can have extremely disadvantageous consequences if the user is not sufficiently qualified. Therefore, for a precise, long-term stable, reliable control of the nozzle temperature, it has become generally accepted to fit each nozzle with one temperature sensor and to determine the manipulated variable for the heating by means of a temperature regulator. This compensates interferences from changing ambient conditions. The user can enter the individual nozzle temperature in ° C. in this process.

EP 0 909 628 presents another solution. In accordance with said proposal, the simultaneous filling of the cavities is ensured by completely monitoring the pressure in each individual cavity to meet highest demands. Beginning with the start of the filling, the filling process for each cavity is detected by monitoring the pressure and compared with a reference sequence for the pressure. The correction takes place by means of an intervention on the heating capacity of each individual nozzle heating such that all individual cavities can be adjusted to a uniform level. The objective of the proposed pressure regulation is to ensure that the pressure increase is fully identical for all cavities over time or that differences are tending towards zero, respectively. For molds with many cavities, such as 48, 96, 128 cavities, an individual temperature measurement and regulation at each nozzle is already a considerable cost factor. For molds set up in a confined space, fitting each nozzle with a temperature sensor is often not feasible. For these reasons, an additional pressure regulation, as suggested in accordance with EP 0 909 628, is economically reasonable and acceptable at all only when there is a smaller number of cavities.

DESCRIPTION OF THE INVENTION

The problem to be solved by the invention was to find an economic solution for the control/regulation of the distribution of the injection molding compound to a multi-cavity injection mold, without loss of quality of control/regulation for each individual cavity, including for a large number of cavities.

The method in accordance with the invention is characterized in that the distribution of the injection material to the individual nozzles takes place by influencing the nozzle heating, with the heating capacity of at least one master nozzle being regulated and the heating capacity of at least one further nozzle being determined by computation and adjusted based on the master nozzle.

The multi-cavity injection mold in accordance with the invention is characterized in that the heating capacity of at least one nozzle can be established via a temperature sensor and regulated by means of a comparison of the target/actual values as a master nozzle, and that the heating capacity of at least one additional nozzle can be set based on the regulated nozzle via a computer.

The inventors have found that for functional reasons, a symmetrical design of cavities and manifolds is ensured in the construction of the molds. Normally it can be taken for granted that all nozzles are arranged at least in a similar position, presenting similar ambient conditions. The novel solution exploits this fact in so far as only a single nozzle needs to be fitted with a complete control including comparison of target/actual values, at least within a discernible similar environment. Any additional and/or all additional nozzles, respectively, in the similar environment can be controlled as slave nozzles via corresponding model computations.

Depending on the symmetry, one cavity or a plurality cavities can be fitted with a nozzle temperature sensor. This nozzle or these nozzles, respectively, will then be regulated. The control compensates the changing ambient influences, such as when the system is started, and maintains the temperature at the nozzle at a constant level. If the manipulated variable of the regulated nozzle is applied to a slave nozzle without temperature sensor, the same temperature will be achieved, with the ambient influences being compensated by the preset values of the master nozzle. It must be possible to influence the manipulated variable of each nozzle in order to ensure an individual adjustability of each nozzle temperature. Modifications of the manipulated variables between 0.1 and 0.5% are required, for example, to cover minor temperature differences of 1° C., which creates very unclear conditions for the user.

The novel invention therefore allows a drastic reduction of the quite considerable expenditure for the control and measurement of actual values without causing a real loss of quality of influencing the distribution of the injection-molding mass through the nozzles to the cavities. Actually, the novel solution allows, by means of computer/storage devices, to retain optimum values for each cavity established once for a certain mold, and to reutilize these values at another time or to constantly improve these values pursuant to a learning intelligence. The deviations established once for a mold can be retained and used as a basis for a subsequent production right from the beginning to be taken into consideration in start-up programs. Briefly expressed, the master nozzle optimizes above all the ambient and changing operational conditions. Owing to this corrective manipulation, the slave nozzles can react to the very special conditions for each individual nozzle, or they can be programmed for their individual deviations, respectively. In this process, the correction for the slave nozzles is reduced to a simple control without the need for temperature sensors, neither in the area of the nozzle nor in the cavity.

The invention allows a host of particularly advantageous embodiments. Reference is made in this context to the various claims.

If there are a large number of cavities, the nozzles are distributed in groups, with the heating capacity of one representative nozzle in each group of nozzles being regulated as for a master nozzle and corrections for the other nozzles of the group being determined by calculation and adjusted. This reduces the expenses for construction work related to sensor technology. In accordance with the novel solution, it is proposed, for example, that at best every fourth, sixth, eighth, twelfth, twenty-fourth, forty-eighth etc. nozzle is fitted with a temperature sensor and that the remaining nozzles are provided without temperature sensors as guided nozzles. If quality requirements are extremely high, it is also conceivable to generally fit only one or two nozzles with a regulation feature and guide the other nozzles as slave nozzles.

The new control/regulation concept is based on the underlying idea that the genuinely and/or classically controlled nozzles are to provide for a comparison of target/actual temperature values and thus also master changing ambient influences. The goal of the novel solution continues to be, as with the state of the art, to gear the manipulated variable for each nozzle to differences in temperature between 1° C. to 5° C. or 1° C. to 10° C., and to seek a modification of the manipulated variable between 0.1 to 0.5%. A very important fact in accordance with the novel solution resides in the fact that temperature values are displayed at the user surface irrespective of whether the heating capacity of a nozzle is guided or regulated. The user or the set-up person of injection molds does not know the optimum temperature for processing from either his own experience or from data provided by the manufacturer of the raw product. The temperature has the maximum plausibility for the control of the process. Moreover, the temperature is a fundamental physical value for which the human being can actually develop a "feeling". Consequently it is most reasonable to use it for display and correction, as it will quickly become part of the empirical knowledge of the setup person. He or she can recall this information as related to individual cavities. This facilitates the task of the person in particular if a target and actual temperature is displayed for each guided or regulated nozzle.

In accordance with the device, the individual nozzles are distributed in groups, with one each group having one regulated master nozzle and the other slave nozzles of the group being adjustable based on the regulated nozzle via a computer and a corresponding model calculation. A virtual actual value resulting from the computation can be displayed.

In accordance with another idea for an embodiment, at least one or a plurality of temperature sensors are assigned to at least one regulated nozzle within a guided zone for the purpose of verifying the underlying model computation. This allows a self-control of the entire control/regulation system. The temperature sensor verifying the computation is not a direct component of a control and therefore reduces the advantage of the novel solution with respect to the issue of constructional effort only imperceptibly.

BRIEF DESCRIPTIONS OF THE INVENTION

Further details of the invention are now described by means of several examples of embodiments.

METHODS AND IMPLEMENTATION OF THE INVENTION

Figure 1:
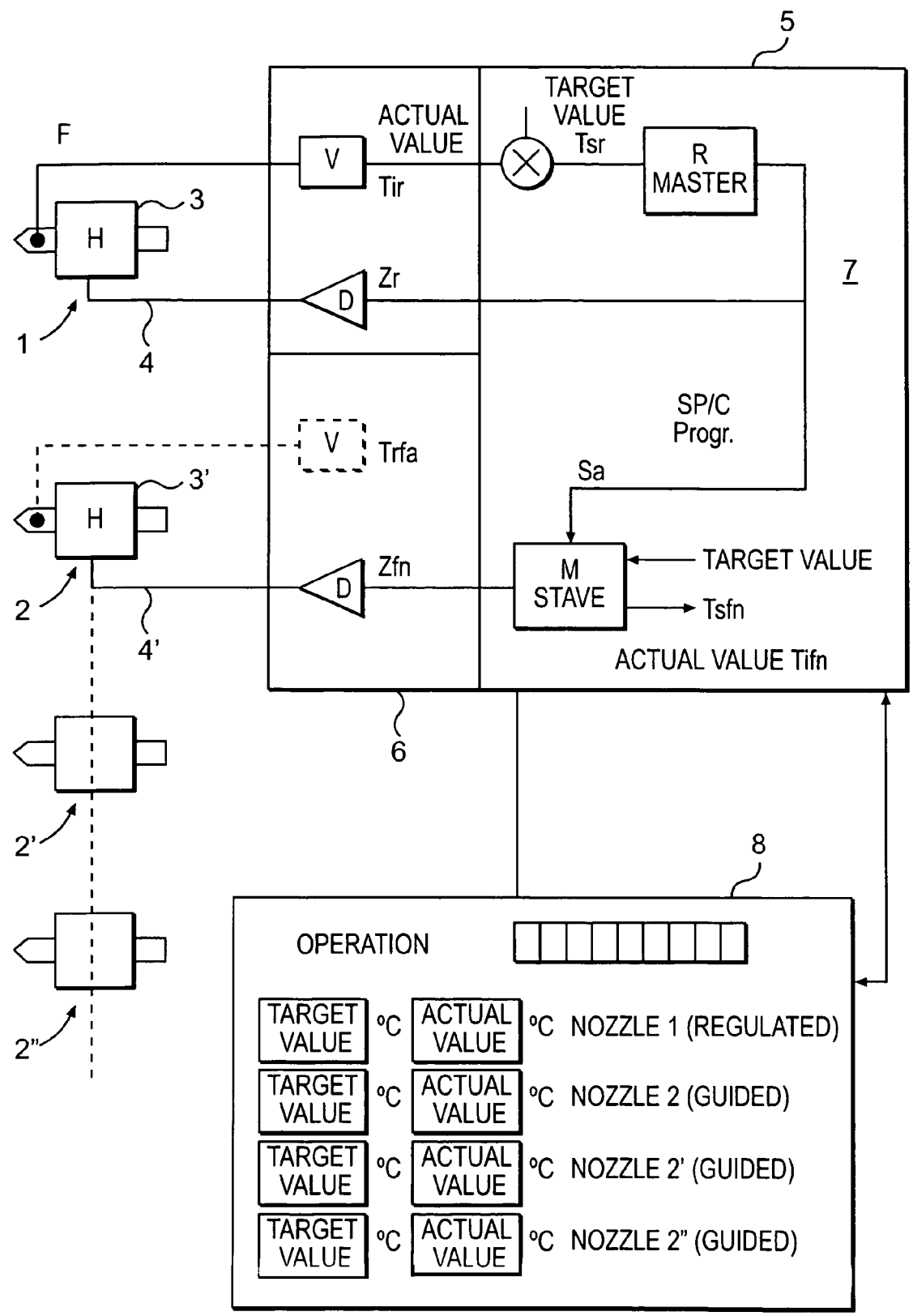
FIG. 1 shows the basic scheme for the combination of the regulated nozzle and guided nozzle or master nozzle and slave nozzle, respectively.

FIG. 1 shows the core of the basic arrangement for the novel solution. The upper part of the picture depicts a master nozzle 1, directly underneath is a slave nozzle 2, under which additional slave nozzles 2', 2", etc. are indicated. A heating 3, 3' etc. is assigned to each nozzle and receives regulating signals from a controller 5 and/or a control unit 6, respectively, via a control line 4, 4'. The target/actual data are transferred from the controller to the overarching computer 7, which has both a memory and a computing function and is the storage device for the required model computations. All target values as well as manipulated variables and the steepness $S_a$ of the manipulated variable are transferred from the computer to the slave nozzles.

An appropriate method can be used to combine the advantages of the easy usage of the temperature-regulated nozzles and the cost and space advantages of the guided nozzles: The manipulated variable of the regulated zone(s) is used as the basis for the guided zone(s). At the user surface, a target temperature is assigned to the guided zones as well as to the regulated zone(s). The temperature difference between the target value of the regulated nozzles $(T_{sr})$ and that of the guided nozzle $(T_{sfn})$ is established. The steepness $(S_a)$ in the current working step can be determined by model computation or experiments. Steepness $(S_a)$=delta manipulated variable/delta temperature. The manipulated variable for each guided nozzle $(Z_{fn})$ is determined pursuant to the following formula $Z_{fn}=Z_r+(T_{sfn}-T_{sr})S_a$.

Because the temperature differences will usually be minor, the temperature of the guided nozzle can be maintained rather accurately such that barely any difference is noted in the behavior as compared with the fully regulated nozzle. The quality of this model can easily be verified by mounting a temperature sensor to an additional nozzle, which, however, will remain guided. This provides for a comparison of the effective actual temperature of a guided nozzle with the target value. If more than one nozzle is regulated, the guided nozzle will be assigned to the regulated nozzle having the most similar features. The actual temperature value can also be determined by the model computation, $T_{ifn}=T_{ir}+(T_{sfn}-T_{sr})$, in order to avoid a difference in the ease of use for the user as compared to a fully regulated nozzle. With this procedure, the user will generally not notice any difference between a mold with regulation of all nozzles as compared to a mold with regulation of only one or a few nozzles and otherwise guided nozzles. The manufacture of the mold and the control, however, will be more cost-efficient with less space required. The user interface is the user panel 8, which—as generally known—can display a host of operational data, operational states, flow schematics, tables, statistics etc. In accordance with the novel solution, an additional display for the target/actual temperature value is assigned to each nozzle. The corresponding temperature is shown in ° C., irrespective of whether the nozzle is regulated or guided.

Figure 2:
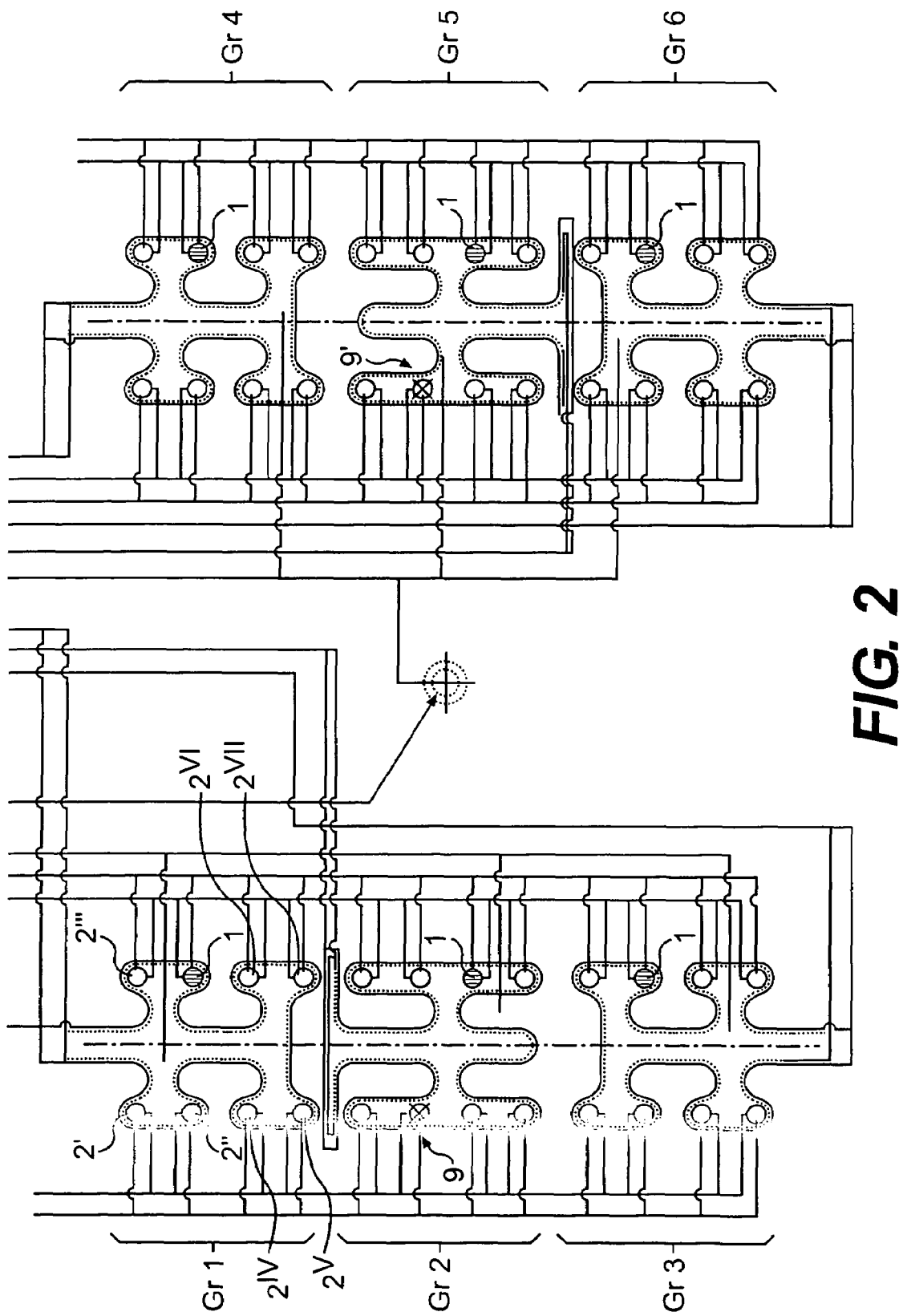
FIG. 2 shows an example for the connections of a multi-cavity injection mold.

FIG. 2 shows schematically the arrangement of forty-eight cavities with the corresponding number of nozzles. All cavities are distributed in groups $Gr_1$ to $Gr_6$ each comprising eight cavities and nozzles, respectively. Each master nozzle 1 is marked in black. Two nozzles 9 and 9', respectively, are marked with a cross. These are control nozzles fitted with a temperature sensor each, but without actual regulation. The nozzle 9, 9' as well as all remaining nozzles (except those marked in black) are slave nozzles guided by the corresponding master nozzles of the same group. Out of the total of forty-eight nozzles, six nozzles are fitted with a temperature sensor and a complete regulation. All others are fitted identically with a heating, but they can only be set via an adjusting process for the heating capacity. The specific actual value is nevertheless displayed on the panel as a virtual value in ° C. The virtual actual temperature value is determined based on the values for the master nozzle and the model computations and can be optimized constantly through experiments and experience.

Figure 3A:
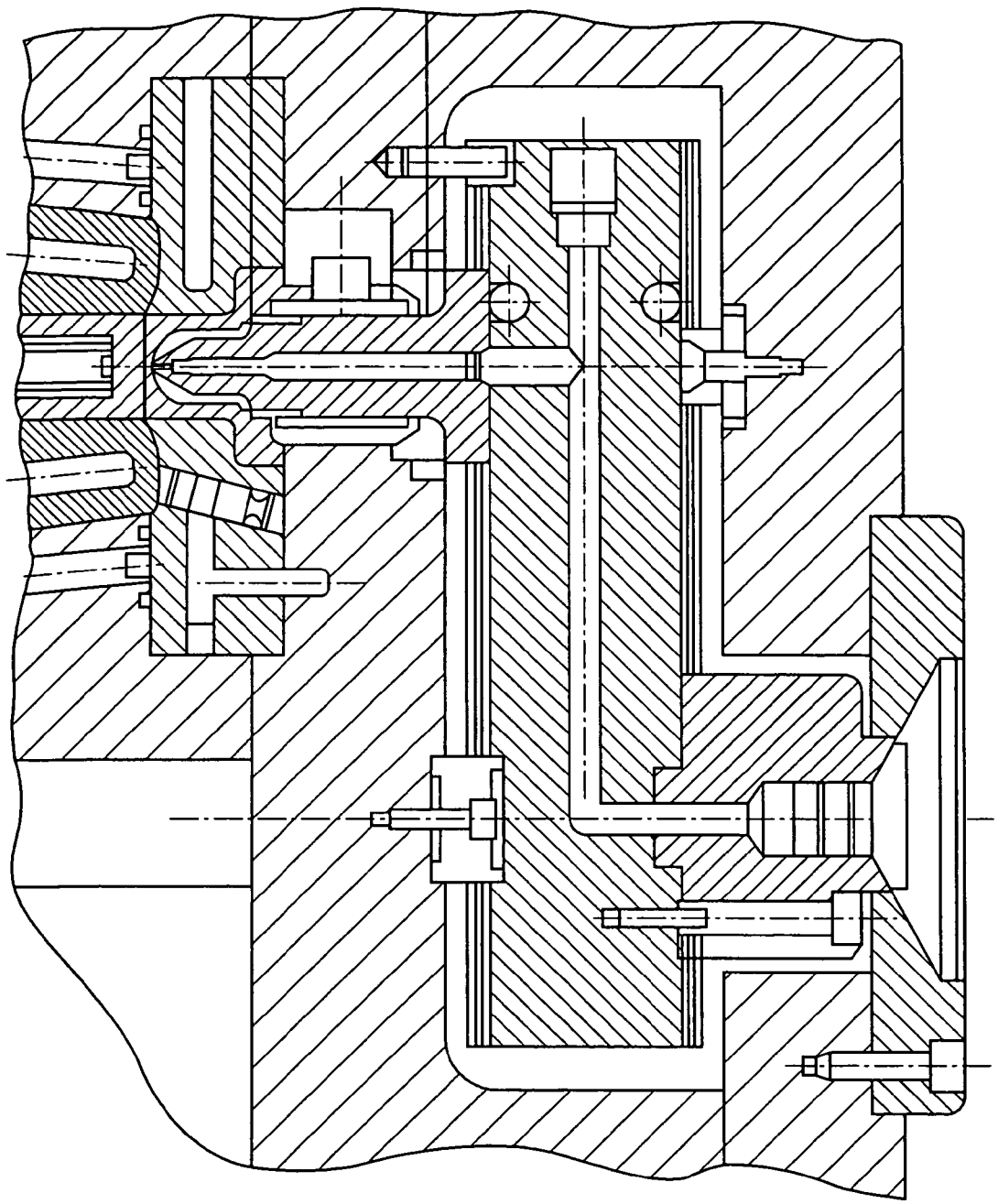
FIGS. 3a and 3b show a reduced and/or magnified section of nozzle area as well as the cavities for pet forms.
Figure 3B:
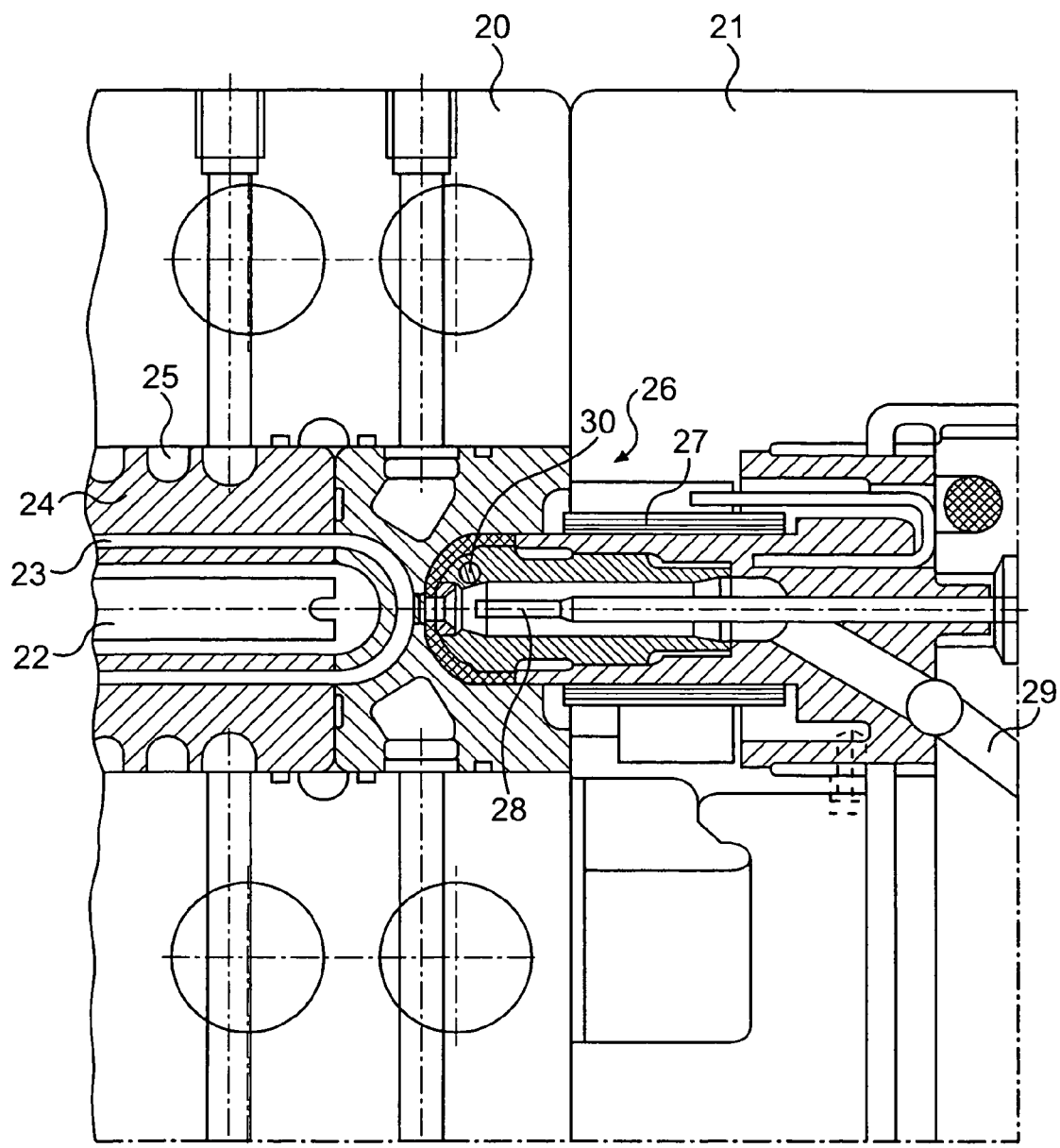

FIGS. 3a and 3b show details of the construction for an individual nozzle. An injection mold 20 is directly placed on top of a manifold block 21. On the mold, a water-cooled spike 22 of a second half of the mold (not shown) is represented, which "internally delineates a preform 23". The external mold is provided by the mold cavity 24, which is fitted with a circumferential water-cooling 25. The nozzle 26 is fitted with a heating jacket 27. In the inside of the nozzle 26 there is a needle valve 28. The nozzle 26 is supplied via a manifold duct 29. The actual temperature of the nozzle is determined via a temperature sensor 30.

The invention claimed is:

1. A method for controlling and/or regulating the distribution of injection molding compound, comprising:
   distributing an injection molding compound to a plurality of molds via a plurality of injection nozzles;
   entering temperature values for each injection nozzle;
   regulating the heating capacity of at least one injection nozzle so as to influence the distribution of the injection molding compound through the nozzles to the plurality of molds;
   wherein at least one injection nozzle is fitted with a nozzle temperature sensor;
   computing the heating capacity of at least one other injection nozzle based on the regulation of the heating capacity of the at least one injection nozzle by model computation;
   displaying temperature values for each injection nozzle;
   wherein the model computation includes computing the difference between the entered temperature value for the at least one injection nozzle and the entered temperature value for the at least one other injection nozzle;
   adjusting the heating capacity of each injection nozzle based on the entered temperature values;
   wherein the at least one other injection nozzle lacks a temperature sensor.

2. The method of claim 1, wherein the plurality of injection nozzles are distributed into groups of injection nozzles.

3. The method of claim 2, further comprising regulating at least one injection nozzle in each group of injection nozzles; and
   setting the heating capacity of each of the remaining injection nozzles in each group of injection nozzles.

4. The method of claim 1, further comprising measuring the heating capacity of the at least one injection nozzle via the nozzle temperature sensor.

5. The method of claim 4, wherein the regulating of the heating capacity of the at least one injection nozzle includes regulating the heating capacity based on the measured heating capacity.

6. The method of claim 1, further comprising compensating for changes in ambient influences during regulation of the heating capacity.

7. The method of claim 1, wherein the injection nozzles are configured such that the heating capacity of each injection nozzle can be independently manipulated by 1° C. to 10° C.

8. The method of claim 1, wherein the injection nozzles are configured such that the heating capacity of each injection nozzle can be independently manipulated by 0.1% to 0.5%.

9. The method of claim 1, further comprising displaying a target temperature for each injection nozzle.

10. The method of claim 1, further comprising displaying a calculated temperature for each injection nozzle.

11. The method of claim 1, further comprising resetting the heating capacity of the at least one other injection nozzle based on the regulation of the heating capacity of the at least one injection nozzle.

12. The method of claim 1, further comprising regulating the heating capacity of the at least one injection nozzle in a regulated zone of the at least one injection nozzle; and resetting the heating capacity of the at least one other injection nozzle in a guided zone of the at least one other injection nozzle based on the regulation of the heating capacity in the regulated zone.

13. A multi-cavity injection molding device, comprising:
at least one injection nozzle being connected to a temperature sensor configured to determine a temperature of the at least one injection nozzle so as to regulate a temperature of the at least one injection nozzle; and
at least one other injection nozzle associated with a computer configured to set a temperature of the at least one other injection nozzle based on the regulated temperature of the at least one injection nozzle;
a user interface for displaying temperature data for each injection nozzle;
wherein the computer regulates the temperature of the at least one injection nozzle by comparing a target temperature and a temperature measured by the temperature sensor,
wherein the computer computes the temperature of the at least one injection nozzle based on the regulation of the heating capacity of the at least one injection nozzle by model computation;
wherein the computer computes the difference between the entered temperature value for the at least one injection nozzle and the set temperature value for the at least one other injection nozzle;
wherein the at least one other injection nozzle lacks another temperature sensor.

14. The device of claim 13, further comprising a plurality of injection nozzles distributed into groups.

15. The device of claim 13, wherein the at least one other injection nozzle comprises a plurality of injection nozzles.

16. The device of claim 13, wherein the injection nozzles are set or regulated by entering temperature values into the computer.

17. The device of 13, further comprising a temperature display for displaying at least one temperature for each injection nozzle.

18. The device of claim 17, wherein the temperature display is for displaying a target temperature and a calculated temperature.

19. The device of claim 18, wherein the actual temperature of the at least one other injection nozzle is determined by the computer.

20. The device of claim 19, wherein the computer is configured to be input with temperature corrections in the form of temperature values.

21. The device of claim 13, further comprising a plurality of cavities, each cavity being in flow communication with a respective injection nozzle.

22. A multi-cavity injection molding device comprising:
at least one injection nozzle being connected to a temperature sensor configured to determine a temperature of the at least one injection nozzle so as to regulate a temperature of the at least one injection nozzle;
at least one other injection nozzle associated with a computer configured to set a temperature of the at least one other injection nozzle based on the regulated temperature of the at least one nozzle; and
at least one additional temperature sensor configured to sense a temperature of the at least one other injection nozzle, so as to compare the sensed temperature with the set temperature,
wherein the temperature of the at least one injection nozzle is regulated by comparing a target temperature and a temperature measured by the temperature sensor of said at least one injection nozzle.

23. A method for controlling and/or regulating the distribution of injection molding compound, comprising:
distributing an injection molding compound to a plurality of molds via a plurality of injection nozzles;
entering temperature values for each injection nozzle
regulating the heating capacity of at least one injection nozzle so as to influence the distribution of the injection molding compound through the nozzles to the cavities;
wherein the at least one injection nozzle is fitted with a nozzle temperature sensor;
computing the heating capacity of at least one other injection nozzle based on regulating the heating capacity of the at least one injection nozzle by model computation;
setting the heating capacity of at least one other injection nozzle based on the computation of the heating capacity of the at least one injection nozzle;
determining an actual heating capacity of the at least one other injection nozzle by sensing an actual temperature of the at least one other injection nozzle; and
comparing the set heating capacity of the at least one other injection nozzle to the actual heating capacity of the at least one other injection nozzle.

* * * * *